United States Patent
Weeks

[15] 3,696,191
[45] Oct. 3, 1972

[54] DENTAL CREAMS CONTAINING ENZYMES

[72] Inventor: Lloyd E. Weeks, St. Louis, Mo. 63141

[73] Assignee: Monsanto Company, St. Louis, Mo.
[22] Filed: Nov. 10, 1970
[21] Appl. No.: 88,437

Related U.S. Application Data

[63] Continuation-in-part of Ser. No. 797,227, Feb. 6, 1969, abandoned.

[52] U.S. Cl. .................................................. 424/50
[51] Int. Cl. ................................................. A61r 7/16
[58] Field of Search ...................................... 424/50

[56] References Cited

UNITED STATES PATENTS 3,194,738    7/1965    Harrisson et al. ............ 424/50

OTHER PUBLICATIONS

Accepted Dental Remedies, 29th ed., published by American Dental Association, 1964, page 184
Molle, J. Southern California State Dental Association, Vol. 35, pp. 391– 395, Sept. 1967
McConn et al., The Journal of Biological Chemistry, Vol. 239, pp. 3706– 3714, November 1964

Primary Examiner—Richard L. Huff
Attorney—Herbert B. Roberts, Neal E. Willis and Roy J. Klostermann

[57] ABSTRACT

This invention relates to dental creams of improved stability containing enzymes and certain surfactants and polishing agents. A dental cream of improved stability comprises, for example, a surfactant, a potassium salt of $\beta$-(sulfo acetamido) ethyl laurate; a polishing agent, dicalcium phosphate dihydrate and a neutral protease along with other conventional dental cream ingredients.

5 Claims, 1 Drawing Figure

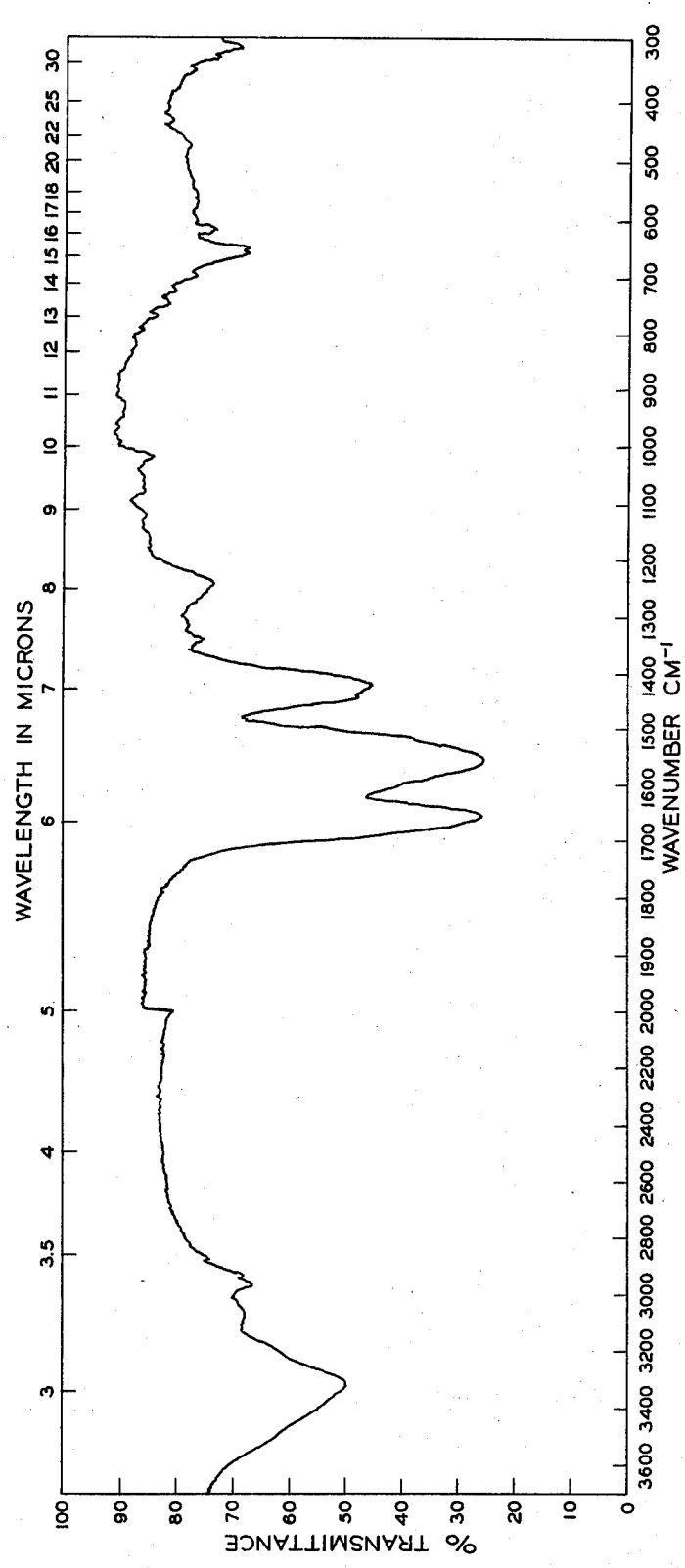

DENTAL CREAMS CONTAINING ENZYMES

CROSS REFERENCE TO RELATED APPLICATIONS

This application is a continuation-in-part of application Ser. No. 797,227, filed, Feb. 6, 1969, now abandoned.

BACKGROUND OF THE INVENTION

Field of the Invention

This invention relates to novel dentifrices, more specifically, to dental creams containing enzymes.

The undesirable effects of poor oral hygiene are well-recognized. It is also known in the art to include enzyme mixtures in various dental preparations to improve oral hygiene.

It has been discovered that enzymes possessing neutral protease activity are quite effective in reducing or removing plaque that has accumulated on teeth and gums. However, incorporation of enzyme mixtures having neutral protease activity into commercially available dental creams have generally not been successful. Usually the neutral protease activity is denatured or lost due to incompatibility with other ingredients present. Therefore, a dental cream that contains an enzyme possessing neutral protease activity and that maintains this activity for normal shelf life periods would be an advancement in the art.

SUMMARY OF THE INVENTION

In accordance with this invention, dental creams are prepared containing a neutral protease which maintains its activity by employing certain surfactants and polishing agents hereinafter to be defined.

BRIEF DESCRIPTION OF THE DRAWING

The figure is an infared spectrum of a neutral protease enzyme.

Neutral proteases used in this invention are metalloenzymes, i.e., those containing metal essential for activity. These metals include zinc, cobalt, nickel, and manganese, and it is preferred that the metal essential for the activity in these enzymes be zinc and it is further preferred that zinc be present in an amount of one gram atom per gram molecule of neutral protease. This characteristic is the single most distinguishing feature between neutral proteases and alkaline proteases, since alkaline proteases do not contain metal essential for activity. The molecular weight of these neutral proteases is from about 36,000 to about 45,000. These proteases exhibit an optimum activity at a pH of about 6 to about 8. Metal chelating agents such as ethylene diamine, tetraacetic acid, and O-phenanthroline inhibit these proteases. Generally, the chelating agents will bind up the metal to yield an inactive enzyme, which may be further converted to a metal-free inactive apo enzyme by prolonged dialysis against a solution of the chelating agent. Both forms of the inactive enzyme may be reactivated by readdition of the metal in excess of any chelating agent present in the system. However, diisopropyl fluorophosphate (DFP) and substituted chloromethyl ketones, do not inhibit these proteases. These proteases exhibit activity against certain furylacryloyl dipeptide amides, such as furylacryloyl-glycyl-L-leucine amide (FAGLA), furylacryloyl, L-phenylalanyl L-phenylalanine amide (FAPPA), and furylacryloyl glycyl L-phenylalanine amide (FAGPA). Esters such as N-carbo-benzoxy (CBZ) - glycine P-nitrophenyl ester, acetyl tyrosine ethyl ester, acetyl phenylalanine ethyl ester and benzoyl tryosine methyl ester are not split by these proteases.

The insulin B-chain is cleaved by these proteases at the following amino acid sites His – Leu (5–6, His – Leu (10–11), Ala – Leu (14–15), Tyr – Leu (16–17), Gly – Phe (23–24), and PHe – Phe (24–25).

Additionally, the neutral proteases exhibit activity against such substrates as casein, hemoglobin, bovine serum albumin or gelatin.

Particularly, preferred neutral proteases are thermally stable, i.e., retaining at least 80 percent of their activity after heating for 30 minutes in 0.1 percent calcium acetate solution, at 70° C. Such proteases differ slightly from non-thermally stable neutral proteases. Thermally stable neutral proteases, have a higher activity against FAGLA than do the non-thermally stable ones. For example, a thermally stable neutral protease, has an activity of 11.5 against FAGLA whereas a non-thermally stable neutral protease has a value of 5.1. The pH activity profile for thermally stable neutral proteases are much more flat than non-thermally stable neutral proteases which are generally sharp. Additional distinctions between the above mentioned neutral proteases and also alkaline proteases may be found in Biotechnology and Bioengineering, John Wiley and Sons, Inc., Volume XII, pages 179–249 (1970) which is incorporated herein by reference.

Alkaline protease as used in this application refers to enzymes which have an optimum activity at a pH of about 8 to about 11. These enzymes are inhibited by DFP but not by metal chelating agents. The molecular weight of these proteases is from about 26,000 to about 30,000. Little or no activity is exhibited against FAGLA, FAPPA and FAGPA. They are, however, active against N-CBZ-glycine P-nitrophenyl ester. The insulin B chain is claved by alkaline proteases at Glu –His (4–5), Ser – His (9–10), Leu – Gly (15–16), Cys – Glu (19–20), Phe – Tyr (25–26), Tyr – Leu (16–17), but not at His – Leu (5–6), His – Leu (10–11), Ala - leu (14–15), or Gly - phe (23–24).

The neutral proteases as a group possess different specificity from the alkaline proteases as a group. For example, alkaline proteases possess esterase activity due apparently to their mechanism of action and not to their pH optimum while neutral proteases do not. Tests demonstrating this fact are more fully described in Arch. Biochem. Biophys. 123, (1968) 572. Since the specificity of neutral and alkaline proteases are different, different values will be obtained if say hemoglobin or bovine serum albumin is substituted for casein in an assay. For example, a neutral protease obtained from B. thermoproteolyticus and an alkaline protease obtained from B. subtilis have activities of 12,800,000 and 3,500,000 units/g respectively when casein is the substrate, but under the same conditions when hemoglobin is substituted, the activities are 240,000 and 400,000 units/g respectively, i.e., the activities of both are less against hemoglobin. Therefore, unitage of enzymes may be expressed in several types of units and, therefore, in applications, enzymes may be used on equal weight bases, equal casein activity or equal hemoglobin unitage, etc. FIG. 1 represents an infrared absorption spectrum of a neutral protease isolated from a fermentation of B. thermoproteolytic in a nutrient medium containing carbon, and nitrogen, sources. The neutral protease had about 13 million units of casein activity per gram. A spectrum was run on a caesium iodide disc containing a 1 percent sample of the enzyme using a Beckman IR–4 spectrophotometer at a speed of 40cm$^{-1}$/minute. The spectrum showed a broad absorption peak between about 3200 to 3600 wave numbers (cm$^{-1}$), two small peaks between about 2920 and about 2970 wave numbers, two large fairly sharp peaks at about 1660 and 1560 wave number, medium to small peaks at about 1400 and 1250, and small peaks about 600 to 700 wave numbers Neutral protease useful in this invention may be obtained from animals, plants or micro-organisms. It is preferred to use neutral proteases of a microbial origin, because they can be economically produced in appreciable amounts. These micro-organisms may produce either predominantly neutral protease, or a mixture of neutral protease and other enzymes.

Examples include *Bacillus*, *Aspergillus* or *Streptomyces* micro-organisms such as various *B. subtilis* strains such as *B. subtilis* strain NRRL B–3411 (U.S. Department of Agriculture Collection, Peoria, Ill.) *B. subtilis var Amyloliquefaciens B. subtilis* strain IAM 1523 (Japanese Culture Collection) all of which produce a mixture of proteases and amylases. Other organisms include *B. thermoproteolyticus*, *Streptomyces griseus*, *Aspergillus oryzae*, *Aspergillus oryzae* strains strains ATCC 11493 and ATCC 14554, *Streptomyces rectus*, *Streptomyces naraensis* and *B. subtilis var amylosacchariticus* all of which produce either a mixture of protease and amylase or only neutral protease. *Streptomyces griseus* strain K–1 produces a predominantly neutral protease. Still other organisms include *B. megaterium* strain MA, (Pasteur Institute) *B. megaterium* ATCC 14581, *B. cereus* strain ATCC 14579, *B. cereus* NCTC 945, *B. polymyxa* ATCC 842, *Pseudomanas aeruginosa* strains IFO 3080, 3454 and 3455, *proteus vulgaris* and *Micrococus caseolyticus*, *Streptomyces fradiae* and *Serratia marcascens* and *Aeromonas proteolytica* ATCC 15338.

A particularly good source of neutral protease is an enzyme mixture produced by *B. subtilis* strain NRRL B–3411. A process for processing this organism and enzymes therefrom is described in U.S. Pat. No. 3,031,380. The enzymatically active material produced by this organism has been found generally to consist of neutral protease, alkaline protease, and amylase. There are generally about 700,000 to about 1.5 million casein units of neutral protease activity per gram of isolated solids and about 350,000 to about 500,000 casein units of alkaline protease activity per gram as determined by the casein digestion method (hereinafter to be described,) or about 12,000–30,000 hemoglobin units of neutral protease per gram of isolated solids and about 35,000–50,000 hemoglobin units of alkaline protease activity per gram. There are about 300,000 to about 500,000 units of amylase activity as determined by the Bernfeld method, hereinafter to be described. As pointed out in the cited patent, the relative proportions of protease to amylase will vary depending on the exact conditions of growth of the micro-organism, but it has been found that the neutral and alkaline protease and the amylase will be produced, in at least some amounts, almost regardless of changes in the culture medium and other conditions of growth of the micro-organism.

Another preferred neutral protease is produced by *B. thermoproleolyticus* and is thermally stable.

The enzymes may be obtained by carrying out the following procedure. An inoculum is generally prepared by growing the organism in a shake flask containing a presterilized nutrient medium such as nutrient broth or malt extract - yeast exextract - peptone-glucose broth. The inoculum is then transferred aseptically to an agitated-aerated fermentor containing a nutrient medium having a carbon source, nitrogen source, minerals, any necessary growth factors and is maintained at the desired temperature and pH which may vary depending on the micro-organism. The temperature may be conventional, and for example, can range from about 20° C to about 60° C but the preferred operating tem-perature is from about 25° C to about 55° C. Likewise, the pH can be conventional, for example can range from a pH of about 4 to about 9, but the preferred operating range is from about 5 to about 8. The time required depends on number of factors including the micro-organsime, the temperature and the media employed. For example, the enzyme composition may be recovered after as little as about 12 hours to as long as about 7 days or longer. The media may contain such ingredients as cereal grains, corn meal, soy flour, distillers solubles, brewers yeast, whey, corn steep liquor. The medium is then monitored for protease production and when the protease level reaches a peak, the fermentation beer may be clarified by centrifugation and the crude enzyme precipitated by the addition of either several volumes of cold organic solvent (e.g., acetone, isopropanol) or by the addition of inorganic salts such as ammonium sulfate or sodium sulfate. The enzyme is then collected by filtration or centrifugation and dried. Further purification may be achieved by established procedures of fermentation, chromatography and gel filtration, etc.

Various techniques can be utilized to separate neutral proteases from enzyme mixtures, such as ion exchange chromotography described in the Journal of Biological Chemistry, 239, 3706 (1964) and in Agr. Biol. Chem. 30, 651 (1966). Such a method is disclosed in copending application no. 752,460 filed Aug. 14, 1968, now Pat. No. 3,592,736 and assigned to the same assignee as this application. The starting material for this technique is water clear fermentation beer, containing the enzyme mixture obtained by filtration or centrifugation, or an aqueous extract of the enzyme mixture obtained by redissolving crude solvent precipitated enzyme mixture. Amylase is removed by solvent fractionation in the presence of a calcium salt or by ammonium sulfate fractionation followed by starch absorption in the presence of aqueous ethanol to remove the last traces of amylase. Pigment is removed by absorption using DEAE-cellulose or other anion exchange resins. The two proteases remaining in solution are fractionated by selective absorption employing hydroxylapatite as the absorbent. The neutral protease is absorbed and subsequently eluted wherein the alkaline protease is unabsorbed.

Other methods for stabilizing neutral protease in the mixture can be accomplished by using specific inhibitors to inactivate the alkaline protease such as DFP or a potato inhibitor and careful solvent fractionation to remove amylase.

Various analytical methods are available for determining enzyme activity, for example, protease activity can be determined by well-known protein digestion methods using protein substrates such as casein, hemoglobin, bovine serum albumin, or gelatin. According to such tests, a protease catalyzes the hydrolysis of a protein (for example, casein) for a certain period of time under controlled conditions of temperature, pH and substrate concentration; the reaction is stopped by addition of trichloroacetic acid, and the solution filtered. The solubilized fragments in the filtrate are determined either by measurement of absorbance in the ultra-violet range or rendered visible by reaction with Folin phenol reagent, and absorbance measured in the visible range and enzyme activity expressed in terms of tyrosine equivalents. This method is more fully described in the Journal of General Physiology, 30, 30, (1947) 291 and in Methods of Enzymology, Vol. 2, New York: Academic Press 1955, 33.

In this application, when neutral protease activity is expressed in casein units, it is understood that such activity is determined at pH 7, and when alkaline protease is expressed in casein units, it is understood that such activity is determined at pH 10.

Other methods for determining protease activity make use of low molecular weight substrates in spectrophotometric assays, for example, the substrate FAGLA is specific for neutral protease and is used to determine neutral protease activity as described in Biochemical Biophysical Research Communications, 32, 326 (1968).

Amylase activity is generally determined by the well-known dinitrosalicylic acid method of Bernfeld as described in Methods of Enzymology, Academic Press, 1955, Vol I, pg. 149. According to this test, amylase catalyzes the hydrolysis of the starch to reducing sugar at a given time and temperature. The reaction is stopped and color developed by the addition of dinitrosalicylic acid. The optical density of the solution is estimated from a standard curve prepared with known amounts of maltose hydrate. In this application, when units of activity of amylase are stated, it is understood that the Bernfeld technique is employed to determine such activity.

The amount of neutral protease present per gram of the dental cream composition should be an amount sufficient to retard or reduce plaque. Generally, this is an amount to provide from about 1,000 casein units of neutral protease activity to about 60,000 casein units of neutral protease activity per gram of the composition, preferably from about 3,000 casein units of neutral protease activity to about 40,000 casein units of neutral protease activity per gram of the composition and more preferably from about 5,000 casein units of neutral protease activity to about 15,000 casein units of neutral protease activity per gram of the composition. When alkaline protease is employed in compositions of the present invention, it is present in an amount to provide from about 150 casein units of alkaline protease activity to about 9,000 casein units of alkaline protease activity per gram of the composition, preferably from about 550 casein units of alkaline protease activity to about 6,000 casein units of alkaline protease activity per gram of the composition and more preferably from about 750 casein units of alkaline protease activity to about 2,250 casein units of alkaline protease activity per gram of the composition. When amylase is employed in compositions of the present invention it is present in an amount to provide from about 150 units of amylase activity to about 9,000 units of amylase activity per gram of the composition, preferably from about 550 units of amylase activity to about 6,000 units of amylase activity per gram of the composition, and more preferably from about 750 units of amylase activity to about 2,250 units of amylase activity per gram of the composition.

The surfactants used in accordance with the present invention that result in a dental cream of improved stability are alkali metal salts of either $\beta$-(sulfo acetamido) ethyl laurate or lauroyl sarcosinate. Examples include $\beta$-(sulfo acetamido) ethyl laurate potassium salt, $\beta$-(sulfo acetamido) ethyl laurate sodium salt, sodium lauroyl sarcosinate and potassium lauroyl sarcosinate. The surfactant is used in an amount of about 0.3 percent by weight to about 3.0 percent weight and preferably in an amount of about 0.8 percent by weight to about 2.0 percent by weight based on the weight of the dental cream. Especially good results, with respect to stability of neutral protease, are obtained with the alkali metal salts of $\beta$-(sulfo acetamido) ethyl laurate, particularly the sodium salt.

Polishing agents that can be used in accordance with this invention include dicalcium phosphate dihydrate, dicalcium phosphate anhydrous, tricalcium phosphate, magnesium carbonate, magnesium phosphate, tetracalcium pyrophosphate, calcium carbonate, aluminum oxide and fine silica.

According to this invention, the polishing agent is used in an amount of from about 30 percent by weight to about 60 percent by weight and preferably in an amount of from about 40 percent by weight to about 50 percent by weight based on the weight of the dental cream.

Water is utilized in the dental creams of the present invention in the usual amounts which is less than about 25 percent by weight based on the weight of the dental cream. Generally, about 3 percent by weight to about 17 percent by weight is preferred.

Other standard dental cream ingredients can be used in accordance with the novel process of the invention such as binders, flavors, sweeteners, dyes, and the like. Examples of binders include carboxymethyl cellulose, carageenan gum, and copolymers of ethylene maleic anhydride. Examples of humectants include glycerin and sorbitol. Examples of flavor include peppermint oil and spermint oil. Sweeteners include sodium or calcium saccharin. Hexachlorophene can also be included for its antiseptic effects. Fluorides can also be included.

Various methods can be used to prepare the dental creams such as those described in Kirk and Othmer, Encyclopedia of Chemical Technology, 4, New York: Interscience, (1954) 928–934.

The following non-limiting examples are given to illustrate the novel composition of the present invention. All proportions, and percentages, unless otherwise stated are percentage by weight.

EXAMPLE I

Into a suitable mixing vessel are charged 5.8 grams of gum and 185 grams of dicalcium phosphate dihydrate and agitated for about 15 minutes. About 97.5 grams of glycerine, 62 grams of water and 0.25 grams of saccharin are charged into a separate container and heated to about 90° C until the saccharin dissolves. This mixture is added to the mixing vessel containing the polishing agent, gum and hexachlorophene and mixed for about 15 minutes. Into a separate container are charged 7.6 grams of β-(sulfo acetamido) ethyl laurate potassium salt and about 17.5 grams of water, and then heated until the salt dissolves. This mixture is then added to the mixing vessel containing the other ingredients along with 2.25 grams of flavor and agitated for about 5 minutes. The cream is then cooled to about 25°C and a slurry of the enzymatically active substance produced by B. subtilis NRRL B-3411 obtained in the manner described in U.S. Pat. 3,031,380 is added and mixed for about 5 minutes. The enzymatically active substance in the slurry provides about 3,000 casein units of neutral protease activity, about 1,000 casein units of alkaline protease activity and about 1,000 units of amylase activity per gram of the dental cream.

Identical toothpastes as above are prepared except that the following ingredients are substituted: lauryl sulfate for β-(sulfo acetamido) ethyl laurate potassium salt (paste 3); lauroyl sarcosinate potassium salt for β-(sulfo acetamido) ethyl laurate potassium salt (paste 2) and insoluble metaphosphate for dicalcium phosphate dihydrate (paste 4).

Four dental creams were prepared following the above procedures having the activity as indicated in Table I and tested for stability. The results of these storage tests are given below.

EXAMPLE II

Into a suitable mixing vessel are charged 883 grams of glycerin, 120 grams of water and 21.8 grams of hydratable gum and mixed for about 3 minutes. To this mixture is added slowly about 900 grams of dicalcium phosphate anhydrous, and agitated until the cream becomes smooth, about 30 minutes. An enzymatically active substance is added in an amount to provide about 6,000 casein units of neutral protease activity per gram of the cream, about 1,500 casein units of alkaline protease activity per gram of the dental cream and about 1500 units of amylase activity per gram of the dental cream. The enzymatically active substance is obtained by B. subtilis NRRL B-3411 in the manner described in U.S. Patent 3,031,380. About 314 gram β-(sulfo acetamido) ethyl laurate potassium salt, about 1.0 gram of saccharin, and about 11 grams of flavor are dissolved in about 20 grams of water and added to the cream mixture and agitated for an additional 10 minutes.

An identical cream (cream 2) is prepared with the exception that an enzyme substance providing about 8,000 casein units of neutral protease activity and about 1,500 casein units of alkaline protease activity per gram of the dental cream is substituted for that use in cream 1. The enzymatically active substance is produced by B. subtilis NRRL B-3411 with the amylase removed by solvent fractionation.

Another identical cream (cream 3) is prepared with the exception that an enzyme substance providing 7000 casein units of neutral protease activity is substituted for the enzymatically active substance used in cream 1. The enzymatically active substance is produced by B. subtilis NRRL B-3411 with the neutral protease being

TABLE I

Storage temperature 25° C,

| Paste | Test ingredient | Casein units of neutral protease activity remaining after— | | | | | |
|---|---|---|---|---|---|---|---|
| | | Initial | 1 week | 3 weeks | 8 weeks | 9 weeks | 1 year |
| 1 | β-(Sulfo acetamido) ethyl laurate potassium salt, DCPD.¹ | 2,400 | 2,305 | 2,100 | 1,920 | 1,780 | 2,012 |
| 2 | Lauryl sarcosinate potassium salt, DCPD.¹ | 2,560 | 2,400 | 2,000 | 1,620 | 1,320 | 1,728 |
| 3 | Lauryl sulfate, DCPD.¹ | 100 | 0 | | | | |
| 4 | β-(Sulfo acetamido) ethyl laurate potassium salt, insoluble metaphosphate | 0 | | | | | |

¹ Dicalcium phosphate dihydrate.

As can be seen from Table I, the stability of neutral protease in formulations containing either sodium lauryl sulfate or the surfactant or insoluble metaphosphate as the polishing agent is poor. On the other hand, good stability of neutral protease is achieved using either β-(sulfo acetamido) ethyl laurate potassium salt or lauroyl sarcosinate potassium salt as the surfactant and dicalcium phosphate dihydrate as the polishing agent.

obtained in the manner described in U.S. Pat. application ser. no. 752,460 filed Aug. 14, 1968.

Still another identical cream (cream 4) is prepared with the exception that sodium lauryl sulfate is substituted for the surfactant used in cream 1.

Four dental creams were prepared following the above procedure and having the initial neutral protease activity indicated in Table II. The results of the storage test are also given in Table II.

TABLE II

Storage temperature 37° C.

| Paste | Test ingredient | Casein units of neutral protease activity remaining (days in storage) | | | | | | | | | | |
|---|---|---|---|---|---|---|---|---|---|---|---|---|
| | | Initial | 2 | 4 | 5 | 7 | 10 | 12 | 17 | 20 | 23 | 30 |
| 1 | β-(Sulfo acetamido) ethyl laurate potassium salt plus alkaline protease neutral protease amylase. | 4,890 | 5,000 | 5,500 | | | 5,100 | 4,800 | | | 4,800 | |
| 2 | β-(Sulfo acetamido) ethyl laurate potassium salt plus alkaline protease neutral protease. | 8,300 | 7,500 | | | 7,900 | | | | | | 7,700 |
| 3 | β-(Sulfo acetamido) ethyl laurate potassium salt plus neutral protease. | 7,300 | | 7,000 | 63,000 | | | | | 6,600 | | |
| 4 | Na lauryl sulfate plus alkaline protease neutral protease amylase. | 5,200 | 1,600 | | 1,800 | | | | | 900 | | |

As can be seen from the results, the dental cream containing the surfactant β-(sulfo acetamido) ethyl laurate potassium salt retains substantially neutral protease activity for a much longer period of time than does the dental cream containing the surfactant sodium lauryl sulfate. Similar results are obtained with the dental cream using only neutral protease.

EXAMPLE III

About 3,700 grams of dicalcium phosphate dihydrate, about 77 grams of hydratable gum are charged into a suitable mixing vessel and agitated for about 15 minutes. Into a separate container are charged 1900 grams of glycerin, 620 grams of water and 5 grams of saccharin and heated to about 90° C to dissolve the saccharin. This solution is added to the dicalcium phosphate dihydrate gum mixture and agitated for about 15 minutes. 182 grams of β-(sulfo acetamido) ethyl laurate sodium salt, and 175 grams water are charged into a container, heated until the salt dissolves, and added to the previous mixture along with 45 grams of flavor. The mixture is agitated until a smooth homogeneous cream is formed and then the enzymatically active substance, obtained in the same manner as in Example I is added to provide about 8,000 casein units of neutral protease activity, and 1,500 casein units of alkaline protease activity.

An identical dental cream is prepared as in Example III with the exception that an enzymatically active substance obtained from *Streptomyces griseus* – K–1 is used to provide 8000 casein units of neutral protease activity.

EXAMPLE IV

An identical paste as that of Example II is prepared except that about 900 grams of anhydrous dicalcium phosphate is substituted for dicalcium phosphate dihydrate. Another paste identical to that of Example II, with the exception that about 31 grams of sodium lauroyl sarcosinate and about 900 grams of anhydrous dicalcium phosphate are substituted, for the surfactant and polishing agent, respectively. Another paste identical to that of Example II is prepared with the exception that about 900 parts of calcium carbonate is substituted for the polishing agent.

EXAMPLE V

An identical paste as to that of Example III is prepared with the exception that an enzymatically active substance obtained from *B. thermoproteolyticus* and providing 8000 casein units of neutral protease activity is used for that of Example III.

Another dental cream identical to that of Example III is prepared using an enzymatically active substance obtained from *B. subtilis* NRRL 644 providing the same level of neutral protease activity as that of Example III.

It is to be understood that the following claims constitute a part of the description of the present invention and consequently are to be considered as such.

What is claimed is:

1. A dental cream comprising (1) a neutral protease, said neutral protease being a metallo- enzyme, having its optimum activity at a pH of about 6 to about 8, having a molecular weight of from about 36,000 to about 45,000 being inhibited by ethylene diamine tetraacetic acid, and O-phenantholine, not being inhibited by DFP and chloromethyl ketones, exhibiting activity against FAGLA, FAPPA and FAGPA, exhibiting on an infared absorpiton spectrum, run as a caseium iodide disc containing a 1 percent by weight sample of neutral protease having a casein activity of 13 million units per gram using a Beckman IR–4 spectrophotometer at a speed of 40cm$^{-1}$/minute, a peak between about 3200 and 3600 wave numbers, two peaks between about 2920 and about 2970 wave numbers, two peaks at about 1660 and 1560 wave numbers and peaks at about 1400, 1250, 700 and 600 wave numbers, and being present in an amount to retard or reduce plaque, (2) a surfactant selected from the group consisting of the alkali metal salts of β-(sulfo acetamido) ethyl laurate and the alkali metal salts of lauroyl sarcosinate, said surfactant being present in an amount of about 0.5 percent to about 3.0 percent by weight based on the weight of the dental cream; and (3) a polishing agent selected from the group consisting of anhydrous dicalcium phosphate, dicalcium phosphate dihydrate, tetracalcium pyrophosphate, calcium carbonate, magnesium carbonate, tricalcium phosphate and fine silica, said polishing agent being present in an amount of about 30 percent to about 60 percent by weight based on the weight of the dental cream, said neutral protease remaining essentially stable in said dental cream.

2. A composition according to claim 1, wherein said neutral protease is present in an amount to provide about 3000 casein units of activity to about 40,000 casein units of activity per gram of said composition.

3. A composition according to claim 2 wherein said neutral protease is thermally stable.

4. A composition according to claim 2 wherein said surfactants are selected from the group consisting of the alkali metal salts of β-(sulfo acetamido) ethyl laurate.

5. A composition according to claim 4 wherein said surfactant is the potassium salt of β-(sulfo acetamido) ethyl laurate.

* * * * *